Figure 1:
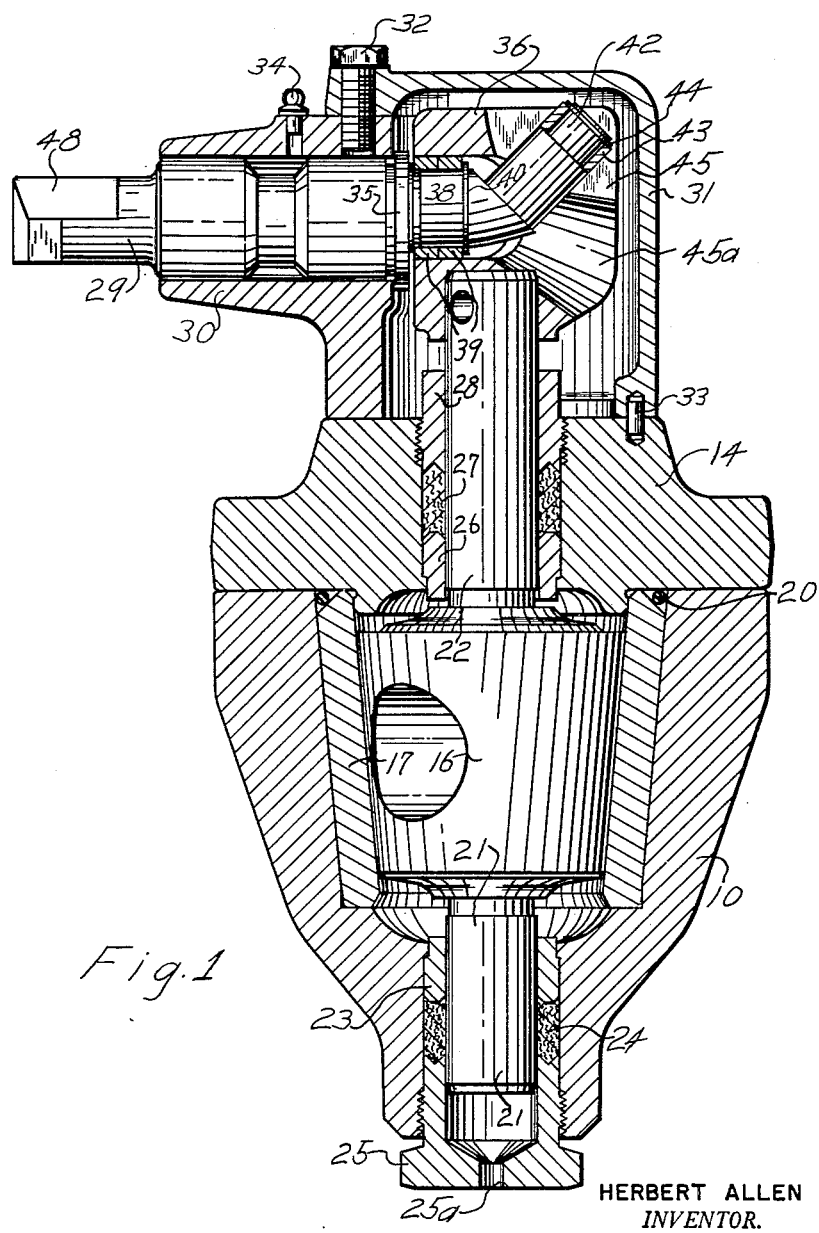

HERBERT ALLEN
INVENTOR.

Aug. 23, 1955  H. ALLEN  2,715,838
PLUG VALVE

Filed Dec. 30, 1949  4 Sheets-Sheet 3

HERBERT ALLEN
INVENTOR.

BY Browning & Simms

ATTORNEYS

Aug. 23, 1955 H. ALLEN 2,715,838
PLUG VALVE
Filed Dec. 30, 1949 4 Sheets-Sheet 4

HERBERT ALLEN
*INVENTOR.*

BY Browning & Simms
ATTORNEYS

United States Patent Office 2,715,838
Patented Aug. 23, 1955

2,715,838

PLUG VALVE

Herbert Allen, Houston, Tex., assignor to Cameron Iron Works, Inc., Houston, Tex., a corporation of Texas Application December 30, 1949, Serial No. 135,966

17 Claims. (Cl. 74—22)

This invention relates to improvements in plug type valves and actuators therefor and refers more particularly to that type of valves where the plug valve members, upon actuation, are moved from their seats, rotated and moved back to seated position.

This type of actuation for plug valves is desirable because the valve member is difficult to turn in opening and closing the valve when the valve member engages the seat. This is particularly true when the valve member and seat are tapered or frusto-conical in shape. Various mechanisms have been devised to provide this type of actuation for the valve member, but they have not been entirely satisfactory because of their complicated nature and because they are difficult to operate both from the standpoint of torque requirement upon the hand wheel or wrench and because they do not operate in the normal manner of valves generally, where the hand part is rotated in one direction to open the valve and in another rotational sense to close the valve.

An object of this invention is to provide a plug valve of the class describd wherein the actuating mechanism is simple, rugged, inexpensive and easily operated in the normal manner for opening and closing valves.

Another object to provide a valve of the class described which is opened by turning the hand part in a single rotational sense and may be closed by turning the hand part in the opposite rotational sense.

A further object is to provide in a valve of the class described an actuating mechanism that does not require ball bearings or other anti-friction bearings and which may still be operated with very low torque requirements.

Still another object is to provide a valve of the class described in which the initial and final movement of the valve member, in both the opening and closing operations, is solely endwise along its rotational axis and the valve member is rotated to change its operational position relative to the flow passage of the valve only intermediate the initial and final movements.

A still further object is to provide a valve of the class described employing crank and follower parts for connecting the valve member to the actuating shaft which is journaled independently of the valve member.

Yet another object is to provide a valve of the class described crank and follower parts for connecting the valve member to an independently journaled shaft to impart forces to the valve member tending to shift the valve member endwise relative to the seat and a separate crank member extending angularly from the shaft engageable with a follower cam carried by the valve member to rotate the valve member when the shaft is rotated.

Yet a further object is to provide a valve of the class described employing crank and follower parts for connecting the valve member to an independently journaled shaft to impart forces to the valve member tending to shift the valve member endwise relative to the seat and a crank member extending angularly from the shaft engageable with a follower cam carried by the valve member throughout only a portion of its rotational cycle to rotate the valve member when the shaft is rotated.

Even another object is to provide a valve of the class described in which a wrench part on the actuating shaft indicates the position of the valve member relative to the flow passage of the valve.

Even a further object is to provide in a valve of the class described a crank and follower connection between an actuating shaft and the valve member which will rotate the valve member only during a part of the rotational cycle of the crank part and wherein these parts co-act during the remainder of the cycle to prevent rotation of the valve member.

Other and further objects of the invention will appear as the description proceeds.

Figure 2:
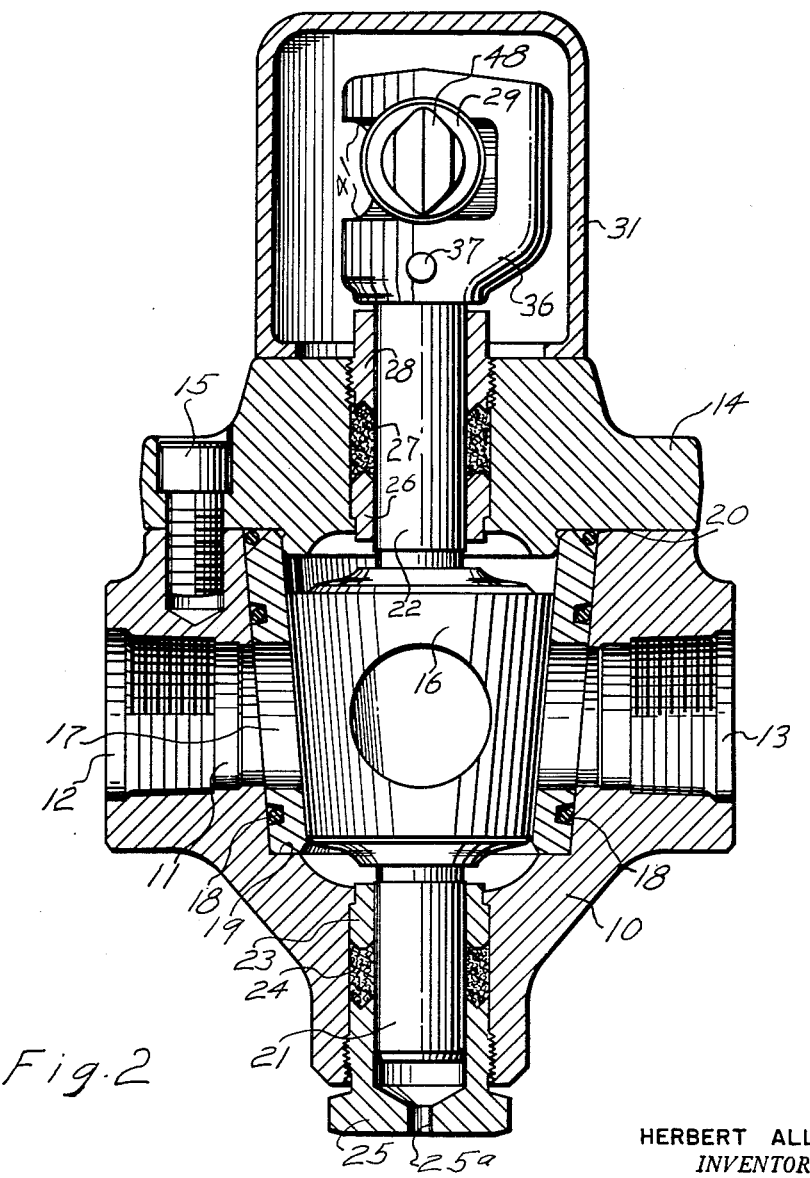
Figure 3:
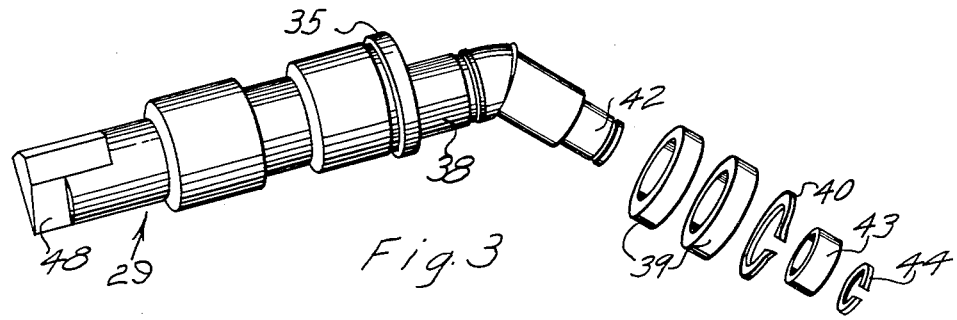

In the accompanying drawings, which are to be read in conjunction herewith, as constituting a part of this specification and wherein like reference numerals are to be used to indicate like parts in the various views:

Fig. 1 is a vertical sectional view of a valve embodying this invention, the view being taken normal to the flow passage through the valve, Fig. 2 is a vertical sectional view of the valve shown in Fig. 1 taken along the longitudinal axis of the flow passage through the valve, Fig. 3 is an exploded view of the actuating shaft of the valve shown in Figs. 1 and 2.

Figure 4:
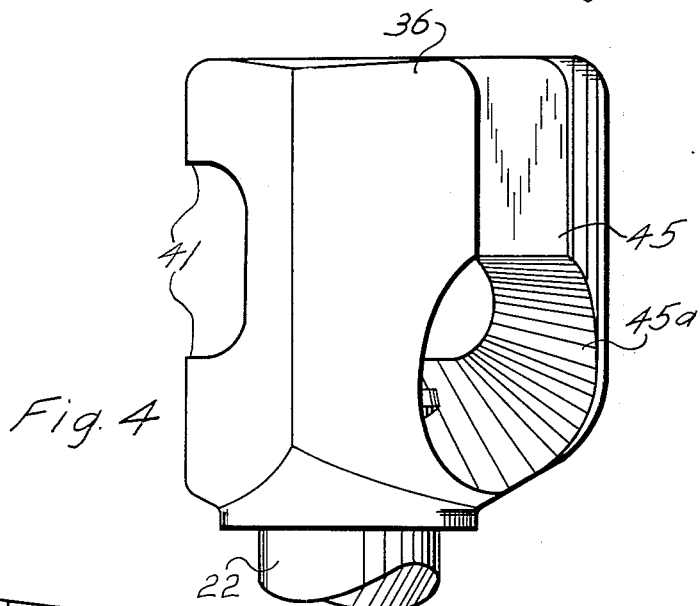
Figure 5:
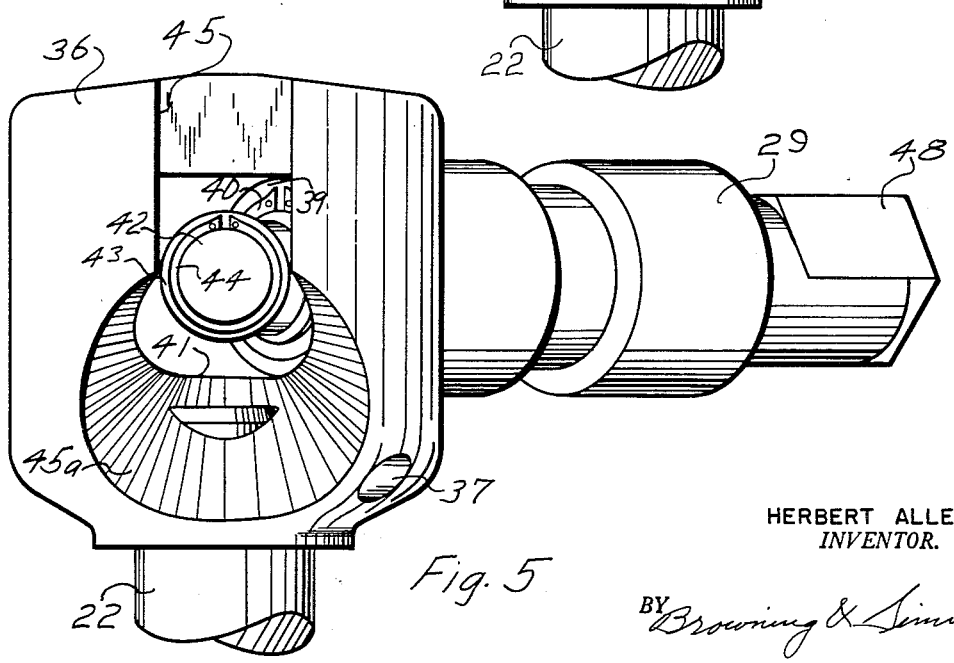
Figure 6:
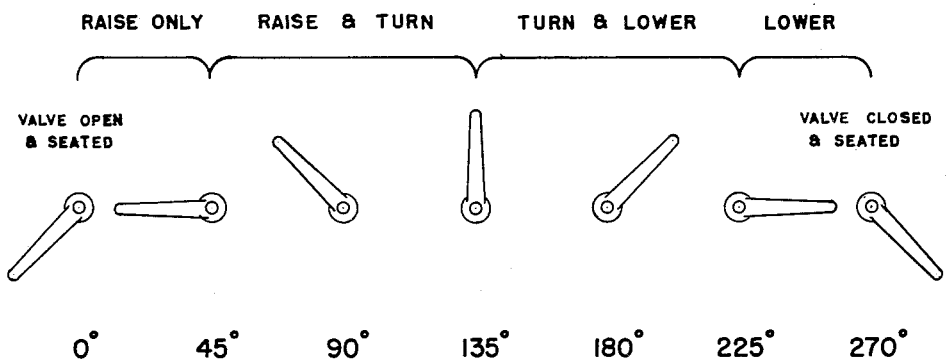
Figure 7:
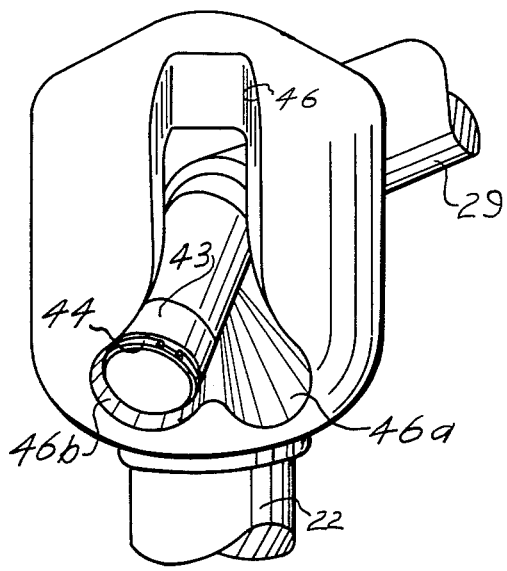

Fig. 4 is a view upon an enlarged scale of the cam or follower part carried by the valve member of the valve shown in Figs. 1 and 2, Fig. 5 is an enlarged view of a portion of the actuating mechanism of the valve shown in Figs. 1 and 2, Fig. 6 is a diagram depicting the type of movement imparted to the valve member at different rotational positions of the actuating wrench or hand part of the valve of Fig. 1, and Fig. 7 is a view on an enlarged scale showing a modified cam or follower part similar to that shown in Fig. 4.

Referring to the drawings, the numeral 10 designates a plug valve body having a flow passage 11 extending therethrough. At the ends of the passage 11 are fittings 12 and 13 for connecting the valve in a conduit. A bonnet 14 is secured to the body 10, as by a plurality of cap screws 15 spaced circumferentially about the bonnet flange.

Within the body 10 is a hollow intersecting the flow passage for receiving a plug valve member 16. Preferably the hollow contains a removable seat ring 17 having openings aligned with the flow passage. The hollow, seat ring and plug valve member are all tapered. The valve member 16 has the usual opening adapted to be selectively aligned with the flow passage and seat ring openings to control flow through the valve.

The seat ring 17 may have seal elements, such as O-rings 18, encircling each opening adapted to seal between the ring and the body. The seat ring is positioned between a shoulder 19 at the bottom of the body hollow and the underside of bonnet 14. A gasket 20 which may be an O-ring, seals between the body and bonnet. It is to be understood that the seat may be formed integrally with the body.

The plug valve member is mounted within the body for rotation and limited endwise movement on a common axis. This may be accomplished by providing the valve member with extensions or stems 21 and 22. The stem 21 has a sealed journal in a stuffing box, carried by body 10, made up of shoulder bushing 23, packing 24 and gland 25. The packing preferably is of the V-type. Gland 25 may have an aperture 25a through which a rod may be passed to force the valve member out of the body with the bonnet removed to facilitate dismantling of the valve.

The stem 22 has a sealed journal in a stuffing box arrangement carried by the bonnet. This stuffing box arrangement comprises the shoulder bushing 26 seated against a shoulder in the bonnet, packing 27, and gland ring 28. The packing 27 may include several V-type rings.

The amount of endwise movement of valve member 16 will be appreciated by comparing Figs. 1 and 2. In Fig. 1, the valve member is shown in its maximum raised position and in Fig. 2, it is in seated position. Referring to Fig. 1, the spacing of the tapered valve member from its seat has not been shown because this space will be so slight that it is not feasible to show it by drafting method. For instance, this spacing will actually be in the order of 12 thousandths inches.

The actuating mechanism for the plug valve member comprises a shaft 29 journaled in the valve housing on an axis intersecting the rotational axis of the valve member and stems 21 and 22 and a force transmitting connection between the shaft and the plug valve member to lift the latter endwise and turn it upon rotation of the shaft.

Shaft 29 may be journaled in a crank housing 30 secured to bonnet 14 as by cap screws not shown in the drawings. A cover 31 may be removably secured to the crank housing and bonnet by cap screw 32 and an aligning pin 33 between the bonnet and cover.

Crank housing 30 has an elongate bearing in which the shaft is journaled, the shaft preferably having a reduced diameter portion for receiving lubricant from an Alemite fitting 34 or the like. A large diameter portion 35 on shaft 29 serves as a thrust bearing between housing 30 and a cam part 36 carried by the plug valve element to limit endwise movement of the shaft. The part 36 is secured to stem 22 by a pin 37.

The shaft carries crank means for imparting forces to the plug valve member, acting through the cam part 36 and stem 22, to effect opening and closing of the valve upon rotation of the shaft. These transmitted forces act on the plug valve member in a direction parallel to its rotational axis to move it off its seat and reseat it and also perpendicularly to and eccentric of the rotational axis of the plug valve member.

Preferably the force transmitting connection includes two separate cranks acting independently of each other for this reduces friction within the connection whereby the valve is easily operated and anti-friction bearings are not required for the actuation mechanism.

The preferred embodiment of this connection is shown in the drawings, wherein a crank pin 38 is formed eccentrically of the shaft and extends parallel to the shaft's rotational axis. Two wear rings 39 fit over the pin and are held thereon by snap ring 40 (refer to Figs. 1 and 3). This snap ring fits a groove at the end of pin 38. The peripheries of rings 39 engage the follower surfaces provided by slot 41 in cam part 36. These surfaces are normal to the rotational axis of the plug valve member, so that as the shaft 29 is turned, forces are transmitted to the cam part tending to shift the plug valve member endwise. The arrangement is such that the plug valve member seats to limit its endwise movement in one direction to prevent full rotation of the shaft 29 through 360°. The preferred arrangement permits rotation of shaft 29 through about 270°. The two rings 39 reduce friction between the rings and cam part 36 when the latter is rotating to turn the plug valve member.

The crank means for turning the plug valve member comprises a crank member 42, which extends angularly from shaft 29 and the acute angle made with the shaft will be one half the available angle through which the plug valve member may be turned if shaft 29 is perpendicular to stem 22. Of course, the contour of the cam surface with which it co-acts will effect the amount of turning of the plug valve member. Where the flow passage 11 is straight and shaft 29 is perpendicular to the stem 22, crank member 42 should extend 45° from the shaft so as to turn valve member 16 through 90° to open and close the valve. The central axes of crank pin 38 and crank member 42 are in a plane which includes the rotational axis of shaft 29, but they act against their respective follower parts 90° out of phase.

Crank member 42 may have a wear ring 43 secured thereto by a split ring 44 which snaps into a groove in the end of the crank member. This wear ring and the enlarged periphery of crank member 42 operate within a cam slot 45 formed in cam part 36. The cam part 36 and walls of slot 45 provide follower parts eccentric of the plug valve member to turn the latter upon rotation of shaft 29. Slot 45 has a portion formed with walls extending parallel to the rotational axis of plug valve member 16, against which the angular crank arm slidingly engages and which resists movement of the crank arm. The cut away portion 45a is such as to permit free movement of the crank member during that portion of its rotational cycle that it resides therein whereby the plug valve member is not turned.

In Fig. 7, the modified cam part has a slot 46 having a substantially vertical portion with other portions 46a and 46b. These portions 46a and 46b are formed to correspond to the travel of the crank member 42 so as not to interfere with its movement but the crank member, residing therein, prevents turning of the plug valve member so that its rotative position is controlled at all times.

To facilitate turning of shaft 29, it has an out of round wrench part upon its end exterior of the housing. This part may be milled to provide a chisel indicator point 48, as seen in Fig. 2. With the point in line with the flow passage, the operator knows the valve is open. With the point at right angles to the flow passage the valve is closed. This is possible where the shaft is turned through about 270°.

In operation the valve is connected in a conduit, flow through which is to be controlled, by means of fittings 12 and 13. With the valve installed, it will be assumed that the plug valve member is in closed position as shown in Fig. 2. The operator will know this for the indicator 48 will be at right angles to the flow line.

To open the valve a wrench or other suitable hand part is placed over the indicator or wrench part 29 and rotated counterclockwise as viewed in Fig. 2. At the time rotation commences, the cranks 38 and 42 will both be at their lowermost positions with crank 42 residing in the cut away portion of its co-acting slot. However, crank 38 is in active engagement with the upper surface of slot 41 and the initial turning of shaft 29 effects a movement of cam part 36 away from seat 17 to unseat the plug valve member 16. Crank 38 initially is about 45° from its position where the greatest rate of endwise movement is imparted to the valve member so that considerable mechanical advantage is available for breaking the valve member from its seat in the event it is stuck.

As shaft 29 is rotated, the lifting rate of the plug 16 increases until shaft 29 has been turned through about 45°. The lift rate decreases through the next 90° of rotation of shaft 29.

Crank 42 is moved into the operative portion of cam slot 45 during the first 45° rotation of shaft 29 and further rotation of the shaft turns the plug valve member at an increasing rate for the next 90° rotation of shaft 29. This rate of turning of plug valve member 16 then decreases to zero during the next 90° rotation of shaft 29 and the plug valve member has at that time been turned 90° to open position. Further rotation of the shaft moves crank 42 into the cut away portion of slot 45.

During this last mentioned rotation of shaft 29, through 90°, crank pin 38 has traveled at an increasing rate toward seat 17 and the crank pin, acting against the lower surface of slot 41, has forced the plug valve member toward its seat. As the rotation of shaft 29 approaches 270°, the plug valve member is forcefully reseated and the wrench should be pushed into full stop position to assure a proper seating of plug valve member 16 in open position.

Reference to Fig. 6 is made where the relative movement of the plug valve, as the shaft is turned, is illustrated. It will be seen from this figure that clockwise rotation of the wrench part closes the valve and counterclockwise rotation of the wrench part opens the valve. In both events, the initial turning of the wrench and shaft 29 serves to unseat the plug valve member without turning it. The next 90° rotation of the wrench continues to move the plug valve member further from its seat and simultaneously it is turned half way toward its new position. The next 90° rotation of the wrench completes the turning of the plug valve member to its new operative position and also starts it on its movement toward the seat. The final 45° of rotation of the wrench does not turn the plug valve member, but moves it to seated position. When the valve is being opened or closed, the wrench is turned until it comes to a full stop. From the above, it is clear that the cranks 38 and 42 act 90° out of phase with one another.

If the cam part of Fig. 7 is used, the crank member 42, as it moves in portions 46a and 46b of cam slot 46, does not impart turning movement to the cam part, but the crank member prevents turning of the cam part and plug valve member under the influence of outside forces. For most valve uses, the friction of stems 21 and 22, in their respective journals, is sufficient to serve this purpose.

It has been found that the valve of this invention may be made without the use of special anti-friction bearings in the actuating mechanism and that best results are actually obtained without their use.

It has been found that the valve of this invention may be used to control both high and low pressures and that very little turning torque is required to operate the valve even under very high line pressure conditions. One reason for this is that there is very little friction between the crank and follower parts of the actuating mechanism for no threads or other large area co-acting surfaces are employed. Another reason for this is that the forces due to line pressure, which tend to move the plug valve member, are balanced for the cross-sectional area of the stems 21 and 22, where they pass through the stuffing boxes, are the same.

The construction of the valve is such that it is rugged and mechanically simple, lending itself to economical fabrication.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An actuator mechanism for a valve of the type having a plug valve member mounted on a stem for rotation and limited endwise movement on a common axis, comprising a shaft journaled for rotation on an axis angularly disposed to the rotational axis of the stem, a connection between the shaft and stem including crank and follower parts carried by the shaft and stem respectively for imparting forces to the stem, upon rotation of the shaft, both in a direction axially of the stem and in a plane normal thereto but displaced therefrom, the coacting surfaces upon the crank and follower parts, which produce the force acting in said plane, being discontinuous within the range of rotation of the shaft to provide for interruption of the driving contact therebetween throughout a portion of a rotational cycle of the shaft whereby the stem is rotated during only a portion of its actuation, said crank and follower parts having co-acting surfaces thereon to produce the force acting axially of the stem, said surfaces being engaged to prevent relative movement therebetween in a direction axially of the stem with the surface on the follower part being fixed against movement relative to the stem in said direction axially of the stem and with the surface on the crank part being disposed thereon to provide, upon continued rotation of the crank part in one direction, a component of movement in said direction axialy of the stem.

2. A mechanical connection adaptable for joining a rotatably mounted shaft with a stem mounted for rotative and limited endwise movement on a common axis intersecting the rotational axis of the shaft and disposed about 90° relative thereto, comprising crank means upon the shaft, follower means carried by the stem engageable by the crank means for imparting endwise movement to the stem upon rotation of the shaft, a crank member extending from the shaft at about 45° from its rotational axis, and a cam surface carried by the stem eccentrically thereof slidably engageable by the angular crank member to follow its movement throughout a portion of its rotational cycle as the shaft is rotated.

3. The connection of claim 2 wherein the crank means and crank member act about 90° out of phase with each other.

4. The connection of claim 2 wherein the cam surface extends parallel to the rotational axis of the stem.

5. A mechanical connection adaptable for joining a rotatably mounted shaft with a stem mounted for rotative and endwise movement on a common axis intersecting the rotational axis of the shaft and disposed about 90° relative thereto comprising a crank pin on the shaft, cam surfaces carried by the stem perpendicular to its rotational axis and engageable by the crank pin, a crank member extending angularly from the shaft, and two parallel cam surfaces formed on the stem eccentrically of its axis of rotation and extending parallel thereto, said crank member extending between and engageable with said parallel cam surfaces.

6. The arrangement of claim 5 wherein the parallel cam surfaces engageable by the angularly extending crank member have only sufficient length to be engaged by said angular crank member throughout only a portion of the rotational cycle of the shaft.

7. An actuator mechanism for a valve of the type having a valve member and stem mounted for rotational and limited endwise movement comprising, in combination with said stem, a rotatable shaft separate from said stem, a first driving connection between said stem and shaft for causing rotation of the stem during rotation of said shaft, and a second driving connection between said stem and shaft including a cam surface carried by and fixed to the shaft against rotation relative to the shaft, said cam surface having at least a portion thereof in driving connection with said stem and also being disposed so that upon continued rotation of said shaft in one direction, said portion has a component of moment endwise of the stem to impart a reciprocatory movement to said stem.

8. A valve actuator mechanism for causing rotational and limited endwise movement of a stem and valve member comprising, in combination with said stem, a rotatable shaft separate from the stem, a cam part mounted on the shaft for rotation of said cam part with the shaft about the rotational axis of the shaft, a follower part connected to said stem against axial movement therebetween, said cam and follower parts having interengaging surfaces with the surface on the cam part disposed so that upon rotation of said shaft in one direction, the cam part moves the follower part and stem in a direction endwise of the stem and upon continued rotation of the shaft and cam part in said one direction, the cam part moves the follower part and stem in an opposite direction endwise of said stem, and connection means between the stem and shaft causing rotation of the stem upon predetermined rotation of the shaft.

9. A valve actuator mechanism for causing rotational and limited endwise movement of a stem and valve member comprising, in combination with said stem, a first driving part having a rotary driving engagement with said stem for causing rotation of the same upon actuation of the first driving part, a second driving part mounted for rotation relative to the stem and having a cam surface in driving engagement with said stem, said cam surface being disposed relative to its engagement with said stem so that upon continued rotation of the driving part in one direction, the stem is driven by said surface first in one endwise direction and then in an opposite endwise direction, and means for actuating said first driving part and for rotating said second driving part.

10. A valve actuator mechanism for causing rotational and limited reciprocatory endwise movement of a stem and valve member comprising, in combination with said stem, a rotatable driving shaft separate from said stem, a discontinuous rotary driving connection between said stem and shaft causing interrupted rotation of said stem during continued rotation of said shaft, and a second driving connection between said stem and shaft including interengaging cam surfaces, one such surface carried by the shaft for rotation therewith about a rotational axis of the shaft and the other such surface carried by the stem and fixed against endwise movement relative to the stem, said shaft surface being disposed relative to said stem surface as to impart said reciprocatory endwise movement to said stem surface during continued rotation of said shaft in one direction.

11. A valve actuator mechanism for causing rotational and limited reciprocatory endwise movement of a stem and valve member comprising, in combination with said stem, a rotatable driving shaft disposed laterally of the rotational axis of said stem, a pair of driving connections between said stem and shaft, one causing rotary movement of the stem on rotation of the shaft and the other causing reciprocatory endwise movement of said stem on the same rotary movement of the shaft, said one connection having interrupted driven surfaces to render it ineffective for limited portions of the rotation of the shaft during reciprocatory movement of the stem and said other connection including a part carried by the shaft for rotation therewith about a rotational axis of the shaft and having a surface at least a portion of which is in driving contact with a surface on said stem, the part surface being disposed so that upon rotation thereof, the portion of its surface in contact with said stem has a component of movement first in one endwise direction relative to the stem and then, upon continued rotation of the part in the same direction, in an opposite endwise direction to thereby reciprocate said stem.

12. A valve actuator mechanism for causing rotational and limited reciprocatory endwise movement of a valve stem comprising, in combination with said stem, a rotatable shaft, driving parts carried by and fixed to said shaft against rotation with respect to the shaft, driven parts carried by said stem with one of said driven parts being fixed against rotation relative to the stem and another driven part against endwise movement relative to the stem, one of said driving parts and said one driven part being connected together to transmit rotative movement of the driving part to said driven part to rotate the same, another driving part being engaged by said another driven part to prevent relative movement therebetween in a direction endwise of the stem, said another driving part being disposed on the shaft as to provide, upon rotation of the shaft, a component of movement thereof in a direction endwise of the stem.

13. An actuator mechanism for a valve of the type having a plug valve member mounted on a stem for rotation and limited endwise movement on a common axis within the body, comprising a shaft journaled for rotation on an axis angularly disposed to the rotational axis of the stem, connection means between the shaft and stem including a pair of crank parts separately attached to the shaft and a pair of follower parts therefor for respectively imparting forces to the stem, upon rotation of the shaft, in a direction along the rotational axis of the stem and in a plane normal thereto but displaced therefrom, said means including driving surfaces carried by said crank parts and driven surfaces carried by said stem, said driving surfaces being movable relative to the driven surfaces so as to be brought into driving contact therewith and also being disposed so that upon rotation of said shaft in a single direction, said driving surfaces provide a component of movement at their driving contact with said driven surfaces first in one direction endwise of said stem and then in an opposite direction endwise of said stem whereby the driven surfaces and the stem carrying the same have a limited endwise movement imparted thereto.

14. An actuator mechanism for a valve of the type having a member mounted for rotation and limited reciprocal movement along its rotational axis, comprising a shaft journaled on an axis intersecting the rotational axis of the member and disposed at an angle thereto, connection means between the shaft and member including a crank pin upon the shaft engageable with cam surfaces carried by the member perpendicular to its rotational axis for imparting reciprocal movement to the member upon rotation of the shaft, and a driving connection between said shaft and member causing rotary movement of the member upon rotation of said shaft.

15. An actuator mechanism for a valve of the type having a member mounted for rotation and limited reciprocal movement along the rotational axis thereof comprising, in combination with said member, an actuator shaft mounted for rotation on an axis intersecting the rotational axis of the member at about 90°, a crank pin on the shaft engageable with cam surfaces carried by the member perpendicular to its rotational axis, and a driving connection between said shaft and member causing rotary movement of the member upon rotation of said shaft.

16. An actuator mechanism for a valve of the type having a member mounted for rotation and limited reciprocal movement along the rotational axis thereof, comprising in combination with said member an actuator shaft mounted for rotation on an axis intersecting the rotational axis of the member at about 90°, a crank pin on the shaft engageable with cam surfaces carried by the member perpendicular to its rotational axis, a crank member extending angularly from the shaft and engageable with two parallel cam surfaces carried eccentrically by the member extending parallel to its rotational axis, these latter cam surfaces having only sufficient length to be engaged by the angular crank member throughout only a portion of the rotational cycle of the shaft.

17. The arrangement of claim 16 wherein the cam surfaces engageable by the crank member have non-parallel portions conforming to the path of travel of the crank member so as to permit free relative movement of the crank member but which prevents rotational movement of the member with the crank member engaged therewith.

References Cited in the file of this patent

UNITED STATES PATENTS

| 591,420 | Onderdonk | Oct. 12, 1897 |
| 1,894,196 | Reed | Jan. 10, 1933 |
| 2,149,725 | Canaries | Mar. 7, 1939 |
| 2,443,995 | Snyder | June 22, 1948 |
| 2,501,150 | Anderson | Mar. 21, 1950 |